United States Patent [19]

Yamada

[11] 4,394,071
[45] Jul. 19, 1983

[54] LENS SYSTEM WITH FILL-IN LENS

[75] Inventor: Yasuyuki Yamada, Mitaka, Japan

[73] Assignee: Canon Kabushiki Kaisha, Tokyo, Japan

[21] Appl. No.: 296,649

[22] Filed: Aug. 27, 1981

[30] Foreign Application Priority Data

Sep. 3, 1980 [JP] Japan .................. 55-122179

[51] Int. Cl.³ .................. G02B 9/62; G02B 15/02
[52] U.S. Cl. .................. 350/422; 350/464; 350/475
[58] Field of Search .................. 350/422, 475, 464

[56] References Cited

U.S. PATENT DOCUMENTS 3,741,621  6/1973  McCrobie .................. 350/422
4,206,971  6/1980  Hamanishi et al. .................. 350/422

FOREIGN PATENT DOCUMENTS

995932  6/1965  United Kingdom .................. 350/475

Primary Examiner—John K. Corbin
Assistant Examiner—Rebecca D. Gass
Attorney, Agent, or Firm—Toren, McGeady and Stanger

[57] ABSTRACT

A lens system having a main photo-taking lens with a fill-in lens detachably set in between the main photo-taking lens and the image plane to change the focal length of the entire system. This fill-in lens has, from front to rear, a positive 1st lens element, a negative 2nd lens element and a positive 3rd lens element. The glass of the positive 1st lens element and the lens form and glass of the positive 3rd lens element are properly chosen to minimize the bulk and size, while still achieving improvements of the image quality.

1 Claim, 36 Drawing Figures

SPHERICAL ABERRATION   ASTIGMATISM   DISTORTION(%)

SPHERICAL ABERRATION  ASTIGMATISM  DISTORTION(%)

SPHERICAL ABERRATION  ASTIGMATISM  DISTORTION(%)

SPHERICAL ABERRATION   ASTIGMATISM   DISTORTION(%)

SPHERICAL ABERRATION   ASTIGMATISM   DISTORTION(%)

SPHERICAL ABERRATION   ASTIGMATISM   DISTORTION(%)

SPHERICAL ABERRATION   ASTIGMATISM   DISTORTION(%)

LENS SYSTEM WITH FILL-IN LENS

BACKGROUND OF THE INVENTION

1. Field of the Invention

This invention relates to optical systems of which the focal length is changed by attaching or detaching a fill-in lens in between the main photo-taking lens and the image plane and more particularly to compact and highly correct fill-in lenses.

2. Description of the Prior Art

It is generally known in the art to elongate or shorten the focal length of a photographic objective by attaching a converter lens in front or in rear of the photographic objective in such a manner as to maintain a fixed focal plane. In this case, the positioning on the object side of the photographic objective, or the front converter lens type requires a bulky converter lens and particularly a front lens element of unduly large diameter, and is difficult to reduce this. Unlike this, the rear converter lens type which arranges the converter lens on the image side of the photographic objective is more advantageous in shortening the lens diameter than the above-mentioned front converter type.

A lens system which may be considered to have taken this kind of advantage is exemplified in Japanese Laid Open Patent No. Sho 54-97423 where use is made of a 6-component converter lens, and, in order to change the focal length of the main photo-taking lens, it is required that the main photo-taking lens is moved forward relative to the camera body, thus elongating the void which later accommodates the converter lens.

On the other hand, the present applicant has proposed in U.S. patent application Ser. No. 219,977 that the number of lens elements constituting the converter lens is reduced so that after the converter lens has been put in between the main lens and the camera body, the accommodating space is shortened in the longitudinal length, thereby giving an additional advantage in that a further minimization of the bulk and size of the camera body is facilitated.

Another aspect of the camera having this kind of converter lens (fill-in lens) incorporating provision is that the diaphragm mechanism and the shutter mechanism are positioned in a space between the main phototaking lens and the fill-in lens. Therefore, the wider the separation between both lenses, the more advantageously these mechanisms are assembled, and the interference of their lens mountings is avoided. But, this gives rise to a problem wherein as the distance from the main photo-taking lens to the film plane increases, the bulk and size of the complete camera is increased. Then, if a compromise between the requirements of widening the axial separation between both lenses and of providing for a shortening of the physical length of the entire lens system is to be made, the negative refractive power of the fill-in lens has to be strengthened which causes the Petzval sum to be increased in the negative sense. Therefore, as the meridional image surface and sagittal image surface incline toward a negative direction, the curvature of field is increased, and strong outward coma is produced.

As additional examples of the arrangement of the fill-in lens to the rear of the main photo-taking lens, reference may be made to U.S. Pat. Nos. 3,741,621 and 4,206,971.

SUMMARY OF THE INVENTION

An object of the present invention is to provide a fill-in lens which although compact, fulfills the requirement of providing a high standard of aberration correction. Accordingly, the use of the fill-in lens in a camera assures that a space sufficiently large to accommodate mechanisms such as the diaphragm is left aside and gives rise to the possibility of achieving stability of the aberrations during the changing of the focal length. The construction and arrangement of the lens of the invention is such that the fill-in lens is attached at a point of position between the main photo-taking lens and the image plane in a releasable manner, and has, from front to rear, a positive 1st lens element, a negative 2nd lens element, and positive 3rd lens element. And, the refractive index and Abbe number of the glass of which the positive 1st lens element is made up, the figuring of the positive 3rd lens, and the refractive index and Abbe number of the glass of which the positive 3rd lens element is made up are so appropriately specified to accomplish the abovedescribed object.

DETAILED DESCRIPTION OF THE PREFERRED EMBODIMENTS

The fill-in lens of the present invention may be used in a space between the main photo-taking lens and the image plane, is releasably mounted therein, and has a positive 1st lens element, a negative 2nd lens element and a positive 3rd lens element in this order from the front, being characterized by the following conditions:

(1) $0.3 < r_5/f < 0.6$
(2) $0.02 < d_5/f < 0.08$
(3) $1.5 < n_1 < 1.7$
(4) $30.0 < \nu_1 < 50.0$
(5) $1.45 < n_3 < 1.75$
(6) $45.0 < \nu_3 < 85$ where $n_1$ and $\nu_1$ are the refractive index for the spectral d line and the Abbe number of the glass of the 1st lens element respectively; $r_5$ is the radius of curvature of the front surface of the 3rd lens element, and $d_5$ is the axial thickness of the same; $n_3$ and $\nu_3$ are the refractive index for the spectral d line and the Abbe number of the glass of the 3rd lens element; and f is the overall focal length of the main photo-taking lens and the fill-in lens.

Next, the significance of each of the above-described various conditions will be explained.

Condition (1) is concerned with the increase of astigmatic difference and the correction of outward coma which give rise to a problem when the separation between the main photo-taking lens and the fill-in lens is widened and at the same time the combined physical length of the main photo-taking lens and the fill-in lens is shortened. That is, when the value of $r_5/f$ exceeds the lower limit, though it is advantageous in correcting the coma, the refractive power of this or front lens surface becomes too strong for avoidance of under-correction of the meridional image surface with the result that the astigmatic difference increases. When the upper limit is violated, it is a minimization of the Petzval sum that can be made possible, and therefore what is well corrected is astigmatism. But, since the refractive power of this lens surface is too weak, coma is not sufficiently corrected and outward coma is left. Therefore, in order to achieve good correction of astigmatism and coma, condition (1) is set forth.

Condition (2) similarly with condition (1) is concerned in particular, with correction of astigmatism and coma. That is, when the value of $d_5/f$ exceeds the lower limit, the refractive power of the 3rd lens element is too weak for avoidance of under-correction of the meridional image surface and sufficient correction of astigmatism cannot be effected. When the upper limit is exceeded, the refractive power of the 3rd lens element becomes strong with an advantage at correction of astigmatism. In this case, however, strong outward coma is produced. Therefore, condition (2) is of importance to facilitating good correction of astigmatism and coma.

Condition (3) is concerned in particular, with correction of coma. That is, when the value of $n_1$ exceeds the lower limit, strong inward coma is produced. When the upper limit is exceeded, strong outward coma is produced. In order to achieve a balanced correction of coma, condition (3) is necessary.

Condition (4) is concerned with correction of chromatic aberrations. That is, when the value of $\nu_1$ exceeds the lower limit, longitudinal and lateral chromatic aberrations are both positive and increased. When the upper limit is exceeded, longitudinal and lateral chromatic aberrations are both increased in the negative sense. Therefore, condition (4) is necessary to correction of chromatic aberrations.

Condition (5) has is particularly concerned with correction of distortion. That is, it is intended that the strong positive distortion produced from the main photo-taking lens and the positive 1st and negative 2nd lens elements in the fill-in lens is balanced out with the negative distortion produced in the 3rd lens element of the fill-in lens. When the value of the refractive index $n_3$ of the 3rd lens element in the fill-in lens exceeds the upper limit of the inequalities (5), though good correction of distortion can be achieved, the Petzval sum is positive and increased, calling for under-correction of the meridional image surface. Therefore, an increase in the astigmatic difference results. Therefore, condition (5) is necessary to the achievement of good balanced correction of distortion and astigmatism.

Condition (6) is concerned with correction of chromatic aberrations. That is, when the value of $\nu_3$ exceeds the lower limit, the longitudinal and lateral chromatic aberrations are both increased in the negative sense. Therefore, condition (6) is necessary to the achievement of good correction of chromatic aberrations.

It is noted here that the lower limit of the inequalities (5) and the upper limit of the inequalities (6) depend upon the presently existing glass materials. Their values may be specified for the time being as 1.45 for the lower limit in condition (5), and as 85 for the upper limit in condition (6).

In the specific embodiments, the positive 1st lens element of the fill-in lens turns its strong convex side (the radius of curvature is smaller in the absolute value than that of curvature of the opposite side) towards the image plane, the negative 2nd lens element in the biconcave form turns its stronger concave side towards the object, and the positive 3rd lens element turns its strong convex side towards the object. The fact that these figurings advantageously work on the aberration correction is pointed out in the before-mentioned preceeding patent application.

An example of a specific main photo-taking lens to which the fill-in lens of the invention is to be attached is first given in the following table for the radii of curvature, $R_i$, of the lens surfaces, the axial thicknesses and air separations, $D_i$, of the lens elements and between the lens elements, the refractive index, $N_i$, for the spectral d line of the glass material of the i-th lens element, and the Abbe number, $\nu_i$, of that glass material.

Focal Length f = 100  F-number = 1:2.8  Image Angle $2\omega$ = 59.3°
Back Focus b.f. = 77.152

| | | | |
|---|---|---|---|
| $R_1$ = 34.595 | | | |
| | $D_1$ = 10.717 | $N_1$ = 1.77250 | $V_1$ = 49.6 |
| $R_2$ = 109.667 | | | |
| | $D_2$ = 3.089 | | |
| $R_3$ = −158.806 | | | |
| | $D_3$ = 5.266 | $N_2$ = 1.72151 | $V_2$ = 29.2 |
| $R_4$ = 32.754 | | | |
| | $D_4$ = 3.555 | | |
| $R_5$ = 260.171 | | | |
| | $D_5$ = 2.054 | $N_3$ = 1.58144 | $V_3$ = 40.7 |
| $R_6$ = 38.414 | | | |
| | $D_6$ = 8.584 | $N_4$ = 1.80610 | $V_4$ = 40.9 |
| $R_7$ = −77.985 | | | |
| | $D_7$ = 4.213 | | |
| $R_8$ = 0. (Stop) | | | |

Next, specific embodiments of the lens system comprising the above-described main photo-taking lens and a fill-in lens are given below.

It should be pointed out in connection with the following embodiments that, when the fill-in lens is attached, the main phototaking lens is shifted forwards to bring the position of the resultant focal plane into coincidence with that of the focal plane for the main photo-taking lens alone.

Figure 1:
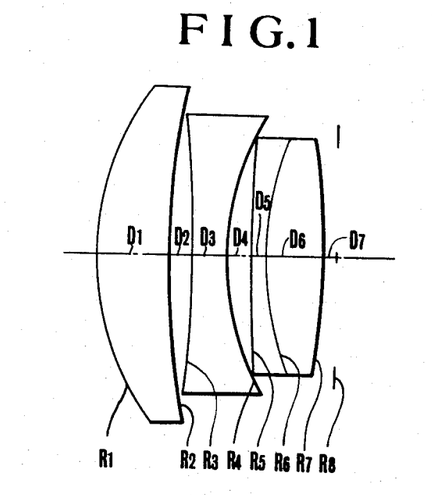
FIG. 1 is a lens block diagram of an example of a main photo-taking lens.
Figure 2A:
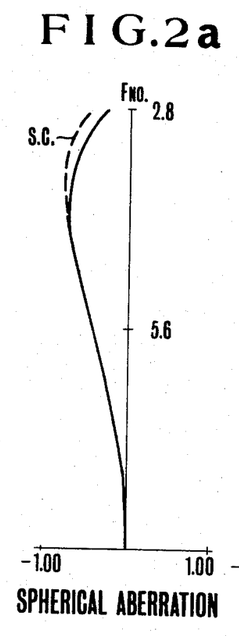
FIGS. 2a, 2b and 2c are graphic representations of the various aberrations of the lens of FIG. 1 with object at infinity.
Figure 2B:
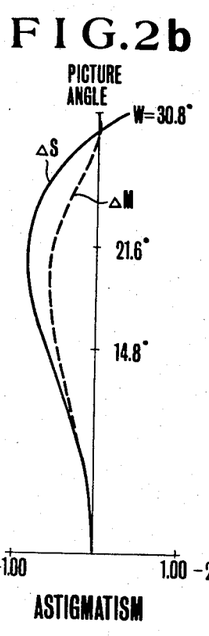
Figure 2C:
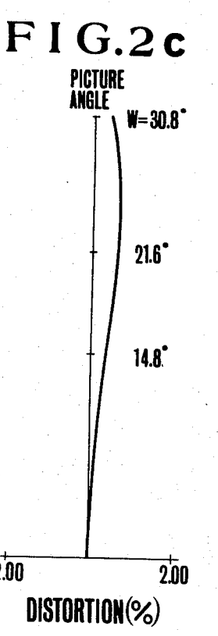
Figure 3:
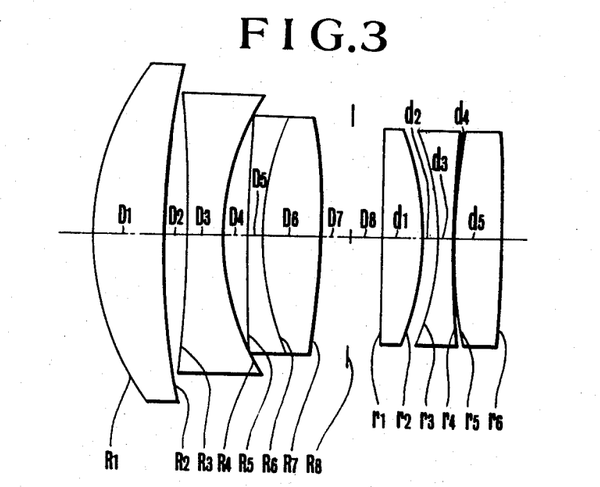
FIGS. 3, 5, 7, 9, 11, 13, 15, and 17 are lens block diagrams of 1st to 8th embodiments of fill-in lenses according to the present invention attached to the main photo-taking lens of FIG. 1 respectively.
Figure 4A:
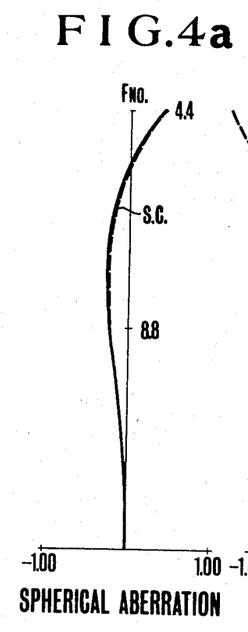
FIGS. 4a to 4c, 6a to 6c, 8a to 8c, 10a to 10c, 12a to 12c, 14a to 14c, 16a to 16c and 18a to 18c are graphic representations of the various aberrations of the 1st to 8th lens systems respectively with object at infinity.
Figure 4B:
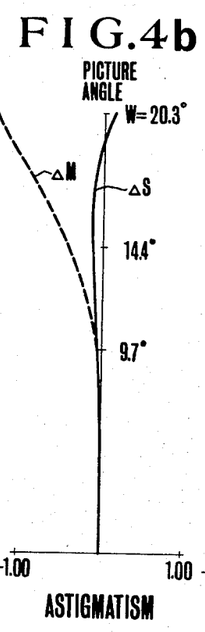
Figure 4C:
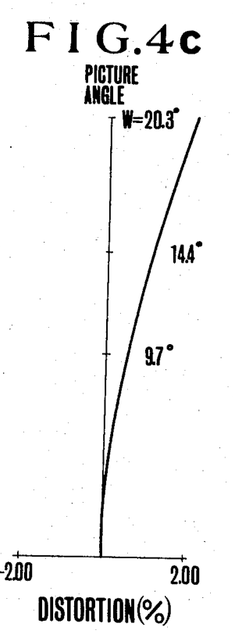

1st Embodiment (FIGS. 3 and 4)

| f = 154.287 | F-No. 1:4.4 | $2\omega$ = 40.5° | b.f. = 89.753 |
|---|---|---|---|
| $R_1$ = 34.595 | | | |
| | $D_1$ = 10.717 | $N_1$ = 1.77250 | $V_1$ = 49.6 |
| $R_2$ = 109.667 | | | |
| | $D_2$ = 3.089 | | |
| $R_3$ = −158.806 | | | |
| | $D_3$ = 5.266 | $N_2$ = 1.72151 | $V_2$ = 29.2 |
| $R_4$ = 32.754 | | | |
| | $D_4$ = 3.555 | | |
| $R_5$ = 260.171 | | | |
| | $D_5$ = 2.054 | $N_3$ = 1.58144 | $V_3$ = 40.7 |
| $R_6$ = 38.414 | | | |
| | $D_6$ = 8.584 | $N_4$ = 1.80610 | $V_4$ = 40.9 |
| $R_7$ = −77.985 | | | |
| | $D_7$ = 4.213 | | |
| $R_8$ = 0. (Stop) | | | |
| | $D_8$ = 4.477 | | |
| $r_1$ = 0. | | | |
| | $d_1$ = 5.740 | $n_1$ = 1.59270 | $\nu_1$ = 35.3 |
| $r_2$ = −36.679 | | | |
| | $d_2$ = 2.265 | | |
| $r_3$ = −33.601 | | | |
| | $d_3$ = 2.159 | $n_2$ = 1.77250 | $\nu_2$ = 49.6 |
| $r_4$ = 93.497 | | | |

| 1st Embodiment (FIGS. 3 and 4) | | | |
|---|---|---|---|
| f = 154.287 | F-No. 1:4.4 | 2ω = 40.5° | b.f. = 89.753 |

-continued

| | $d_4 = 0.263$ | | |
|---|---|---|---|
| $r_5 = 67.147$ | | | |
| | $d_5 = 6.846$ | $n_3 = 1.49831$ | $\nu_3 = 65.0$ |
| $r_6 = -633.479$ | | | |

3rd Order Aberration Coefficients (with Inclusion of Main Lens)

| No. | L | T | SA | CM | AS | PT | DS |
|---|---|---|---|---|---|---|---|
| $R_1$ | 0.04889 | −0.00133 | 21.8115 | −0.5940 | 0.0162 | 1.9437 | −0.0534 |
| $R_2$ | 0.01222 | −0.01348 | 2.0220 | −2.2315 | 2.4625 | −0.6131 | −2.0409 |
| $R_3$ | −0.05040 | 0.02772 | −16.4071 | 9.0239 | −4.9632 | −0.4072 | 2.9537 |
| $R_4$ | −0.06356 | −0.00946 | −20.0621 | −2.9852 | −0.4442 | −1.9742 | −0.3599 |
| $R_5$ | 0.01075 | 0.01037 | 0.5828 | 0.5621 | 0.5422 | 0.2180 | 0.7332 |
| $R_6$ | 0.01018 | 0.00136 | 6.2538 | 0.8323 | 0.1108 | 0.3159 | 0.0568 |
| $R_7$ | 0.03387 | −0.01545 | 11.0172 | −5.0240 | 2.2910 | 0.8830 | −1.4474 |
| $R_8$ | | | | | | | |
| $r_1$ | −0.01483 | 0.01289 | −1.5588 | 1.3554 | −1.1786 | 0.0 | 1.0248 |
| $r_2$ | 0.05466 | −0.00794 | 61.9026 | −8.9918 | 1.3061 | 1.5653 | −0.4171 |
| $r_3$ | −0.04086 | 0.00518 | −64.7666 | 8.2105 | −1.0408 | −2.0012 | 0.3856 |
| $r_4$ | −0.00517 | −0.01180 | −0.0326 | −0.0745 | −0.1699 | −0.7192 | −2.0280 |
| $r_5$ | 0.00446 | 0.00700 | 0.1515 | 0.2381 | 0.3744 | 0.7642 | 1.7900 |
| $r_6$ | 0.00416 | −0.00522 | 0.4443 | −0.5577 | 0.6999 | 0.0810 | −0.9801 |
| Total | 0.00435 | −0.00015 | 1.3584 | −0.2363 | 0.0064 | 0.0562 | −0.3826 |

L: Lateral Chromatic Aberration Coefficient
T: Longitudinal Chromatic Aberration Coefficient
SA: Spherical Aberration Coefficient
CM: Coma Coefficient
As: Astigmatism Coefficient
PT: Petzval Sum
DS: Distortion Coefficient In the following tables, the numerical data concerning with the main photo-taking lens are omitted. However, the focal length f, F-number, image angle and back focus are described with their values taken when the fill-in lens in the corresponding embodiment is attached to the above-described main photo-taking lens.

Figure 5:
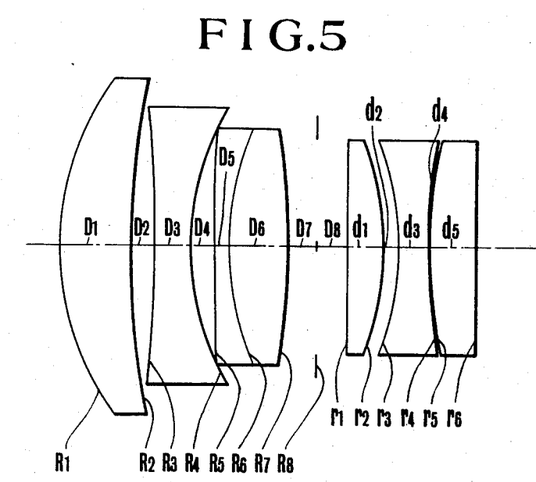
Figure 6A:
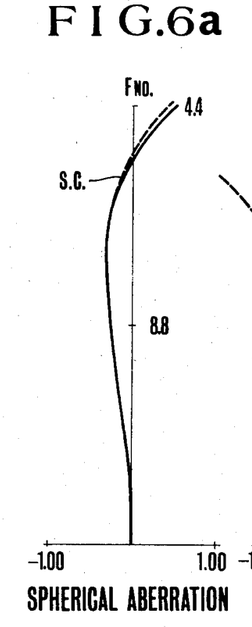
Figures 6B, 6C:
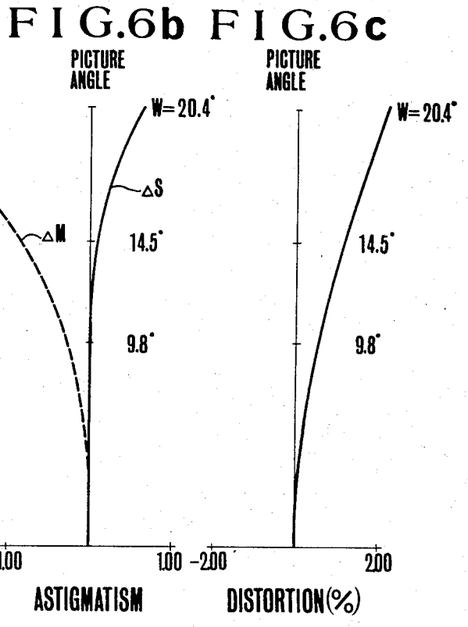

| 2nd Embodiment (FIGS. 5 and 6) | | | |
|---|---|---|---|
| f = 152.536 | F-No. 1:4.4 | 2ω = 40.9° | b.f. = 88.314 |
| $R_8 = 0.$ (Stop) | $D_8 = 4.474$ | | |
| $r_1 = 0.$ | | | |
| | $d_1 = 5.040$ | $n_1 = 1.59270$ | $\nu_1 = 35.3$ |
| $r_2 = -37.732$ | | | |
| | $d_2 = 2.286$ | | |
| $r_3 = -34.630$ | | | |
| | $d_3 = 4.189$ | $n_2 = 1.77250$ | $\nu_2 = 49.6$ |
| $r_4 = 61.126$ | | | |
| | $d_4 = 0.263$ | | |
| $r_5 = 55.485$ | | | |
| | $d_5 = 6.981$ | $n_3 = 1.7200$ | $\nu_3 = 50.2$ |
| $r_6 = 1468.555$ | | | |

Figure 7:
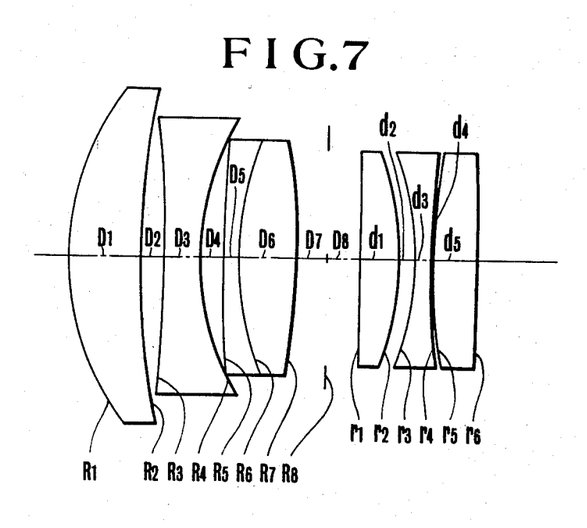
Figure 8A:
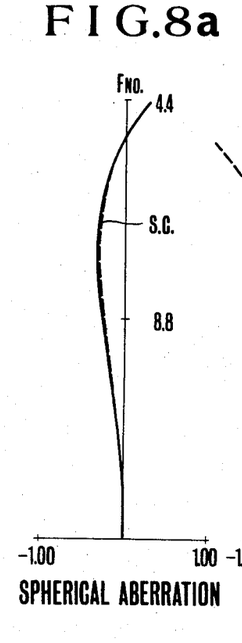
Figure 8B:
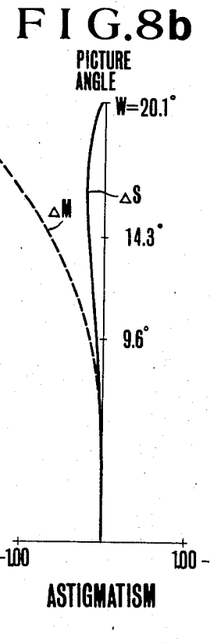
Figure 8C:
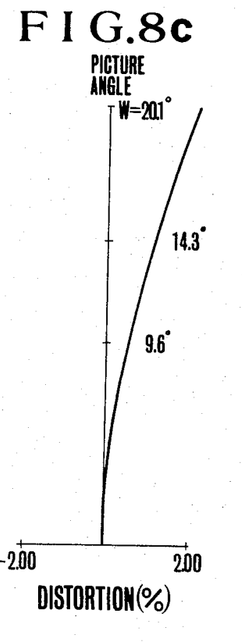

| 3rd Embodiment (FIGS. 7 and 8) | | | |
|---|---|---|---|
| f = 155.362 | F-No. 1:4.4 | 2ω = 40.3° | b.f. = 89.707 |
| $R_8 = 0.$ (Stop) | $D_8 = 4.771$ | | |
| $r_1 = 0.$ | | | |
| | $d_1 = 5.809$ | $n_1 = 1.59270$ | $\nu_1 = 35.3$ |
| $r_2 = -36.844$ | | | |
| | $d_2 = 2.304$ | | |
| $r_3 = -33.729$ | | | |
| | $d_3 = 2.330$ | $n_2 = 1.77250$ | $\nu_2 = 49.6$ |

-continued

| 3rd Embodiment (FIGS. 7 and 8) | | | |
|---|---|---|---|
| f = 155.362 | F-No. 1:4.4 | 2ω = 40.3° | b.f. = 89.707 |
| $r_4 = 96.909$ | | | |
| | $d_4 = 0.263$ | | |
| $r_5 = 65.452$ | | | |
| | $d_5 = 6.567$ | $n_3 = 1.46450$ | $\nu_3 = 66.0$ |
| $r_6 = -693.008$ | | | |

Figure 9:
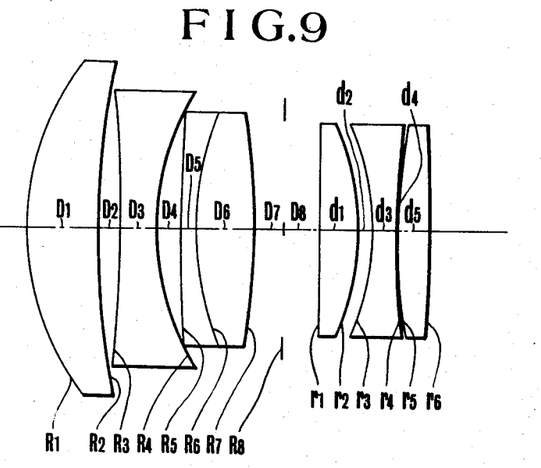
Figure 10A:
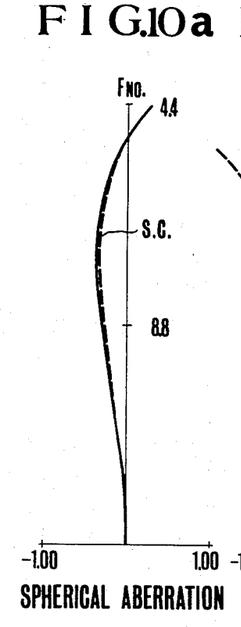
Figure 10B:
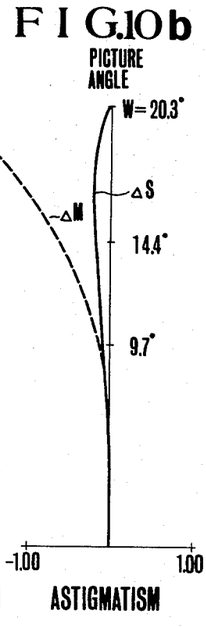
Figure 10C:
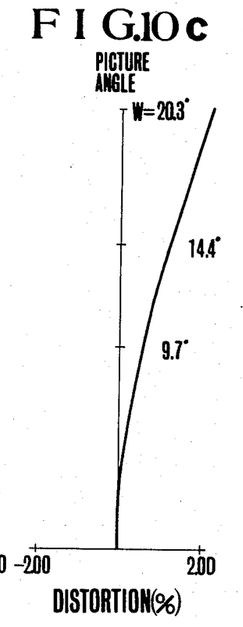

| 4th Embodiment (FIGS. 9 and 10) | | | |
|---|---|---|---|
| f = 153.723 | F-No. 1:4.4 | 2ω = 40.7° | b.f. = 89.130 |
| $R_8 = 0.$ (Stop) | $D_8 = 5.413$ | | |
| $r_1 = -2729.781$ | | | |
| | $d_1 = 5.279$ | $n_1 = 1.59270$ | $\nu_1 = 35.3$ |
| $r_2 = -36.854$ | | | |
| | $d_2 = 2.318$ | | |
| $r_3 = -33.771$ | | | |
| | $d_3 = 3.351$ | $n_2 = 1.77250$ | $\nu_2 = 49.6$ |
| $r_4 = 93.298$ | | | |
| | $d_4 = 0.263$ | | |
| $r_5 = 67.147$ | | | |
| | $d_5 = 4.740$ | $n_3 = 1.49831$ | $\nu_3 = 65.0$ |
| $r_6 = -513.954$ | | | |

Figure 11:
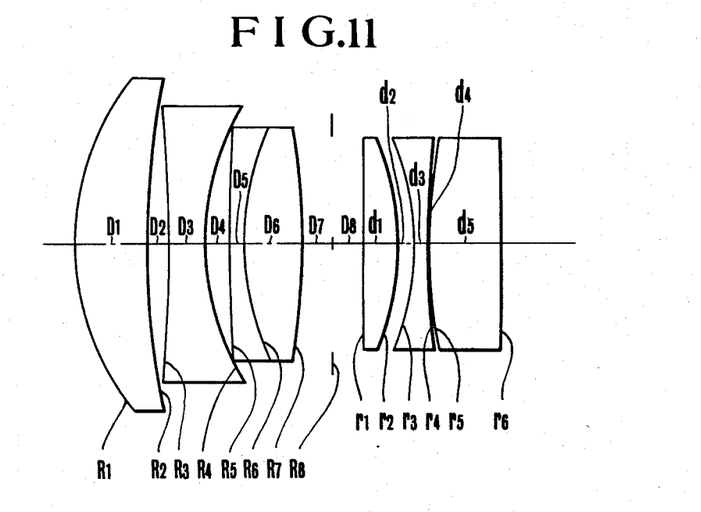
Figure 12A:
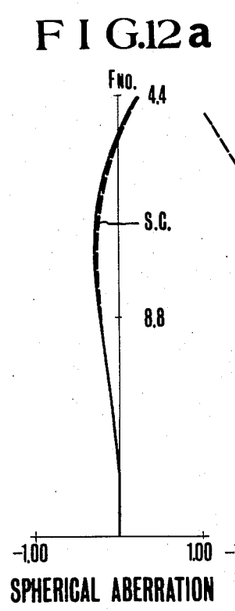
Figures 12B, 12C:
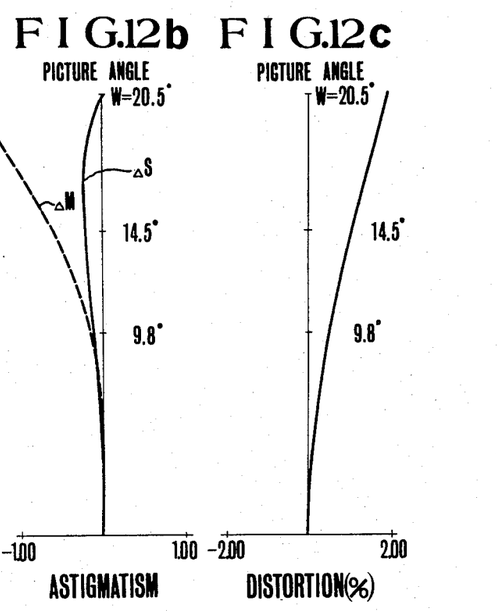

| 5th Embodiment (FIGS. 11 and 12) | | | |
|---|---|---|---|
| f = 152.609 | F-No. 1:4.4 | 2ω = 40.9° | b.f. = 89.070 |
| $R_8 = 0.$ (Stop) | $D_8 = 4.475$ | | |
| $r_1 = 0.$ | | | |
| | $d_1 = 5.055$ | $n_1 = 1.59270$ | $\nu_1 = 35.3$ |
| $r_2 = -36.773$ | | | |
| | $d_2 = 2.288$ | | |
| $r_3 = -33.662$ | | | |
| | $d_3 = 2.043$ | $n_2 = 1.77250$ | $\nu_2 = 49.6$ |
| $r_4 = 94.561$ | | | |
| | $d_4 = 0.263$ | | |
| $r_5 = 66.521$ | | | |
| | $d_5 = 10.533$ | $n_3 = 1.49831$ | $\nu_3 = 65.0$ |
| $r_6 = -631.474$ | | | |

| | 3rd Order Aberration Coefficients (with Inclusion of Main Lens) | | | | | | |
|---|---|---|---|---|---|---|---|
| No. | L | T | SA | CM | AS | PT | DS |
| $R_1$ | 0.04836 | −0.00133 | 21.1065 | −0.5812 | 0.0160 | 1.9225 | −0.0534 |
| $R_2$ | 0.01208 | −0.01348 | 1.9567 | −2.1831 | 2.4357 | −0.6065 | <2.0409 |
| $R_3$ | −0.04985 | 0.02772 | −15.8768 | 8.8284 | −4.9091 | −0.4028 | 2.9537 |
| $R_4$ | −0.06287 | −0.00946 | −19.4136 | −2.9206 | −0.4394 | −1.9527 | −0.3599 |
| $R_5$ | 0.01063 | 0.01037 | 0.5639 | 0.5499 | 0.5363 | 0.2157 | 0.7332 |
| $R_6$ | 0.01007 | 0.00136 | 6.0516 | 0.8143 | 0.1096 | 0.3125 | 0.0568 |
| $R_7$ | 0.03350 | −0.01545 | 10.6611 | −4.9152 | 2.2661 | 0.8734 | −1.4474 |
| $R_8$ | | | | | | | |
| $r_1$ | −0.01467 | 0.01290 | −1.5084 | 1.3261 | −1.1658 | 0.0 | 1.0249 |
| $r_2$ | 0.05457 | −0.00823 | 60.7966 | −9.1711 | 1.3835 | 1.5443 | −0.4417 |
| $r_3$ | −0.04079 | 0.00539 | −63.6017 | 8.4056 | −1.1109 | −1.9758 | 0.4079 |
| $r_4$ | −0.00512 | −0.01176 | −0.0308 | −0.0708 | −0.1627 | −0.7034 | −1.9905 |
| $r_5$ | 0.00452 | 0.00699 | 0.1571 | 0.2429 | 0.3754 | 0.7630 | 1.7596 |
| $r_6$ | 0.00406 | −0.00507 | 0.4323 | −0.5394 | 0.6730 | 0.0804 | −0.9400 |
| Total | 0.00451 | −0.00006 | 1.2944 | −0.2141 | 0.0076 | 0.0707 | −0.3376 |

Figure 13:
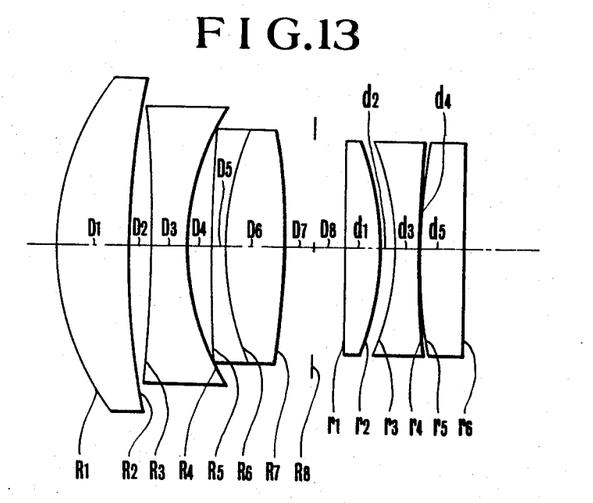
Figure 14A:
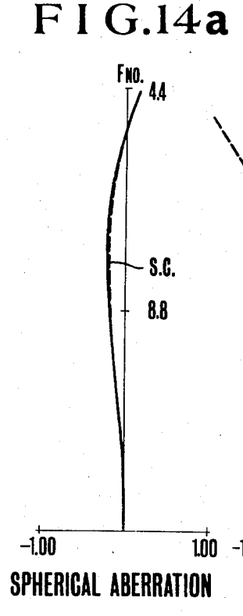
Figure 14B:
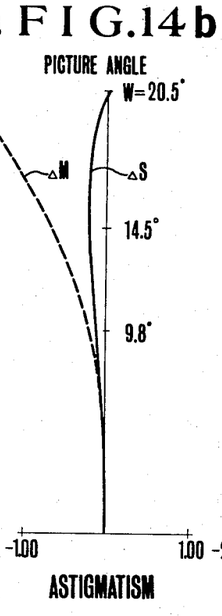
Figure 14C:
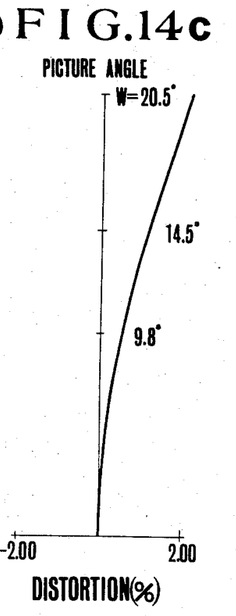

| 6th Embodiment (FIGS. 13 and 14) | | | | |
|---|---|---|---|---|
| f = 152.658 | F-No. 1:4.4 | 2ω = 40.9° | b.f. = 87.849 | |
| $R_8 = 0.$ (Stop) | | | | |
| | $D_8 = 4.462$ | | | |
| $r_1 = 4216.695$ | | | | |
| | $d_1 = 5.096$ | $n_1 = 1.59270$ | $\nu_1 = 35.3$ | |
| $r_2 = -36.441$ | | | | |
| | $d_2 = 2.142$ | | | |
| $r_3 = -33.800$ | | | | |
| | $d_3 = 3.504$ | $n_2 = 1.78590$ | $\nu_2 = 44.2$ | |
| $r_4 = 120.274$ | | | | |
| | $d_4 = 0.263$ | | | |
| $r_5 = 78.621$ | | | | |
| | $d_5 = 6.578$ | $n_3 = 1.51742$ | $\nu_3 = 52.4$ | |
| $r_6 = -5642.191$ | | | | |

Figure 17:
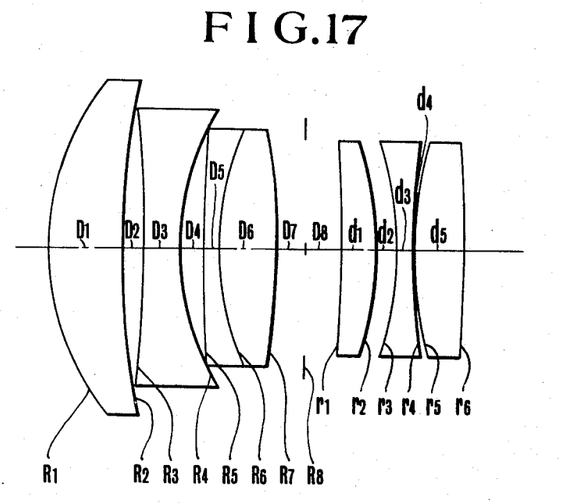
Figure 18A:
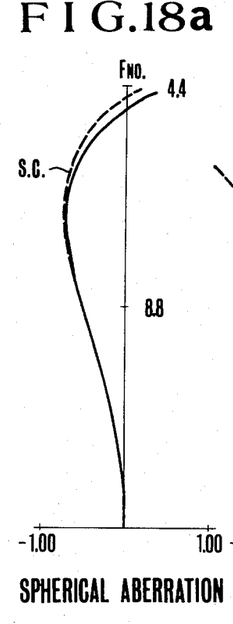
Figure 18B:
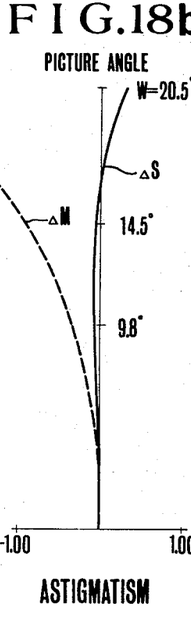
Figure 18C:
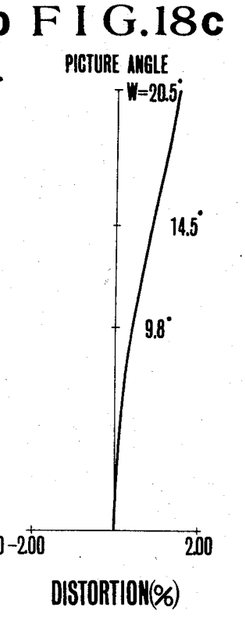

| 8th Embodiment (FIGS. 17 and 18) | | | | |
|---|---|---|---|---|
| f = 152.662 | F-No. 1:4.4 | 2ω = 40.9° | b.f. = 88.430 | |
| $R_8 = 0.$ (Stop) | | | | |
| | $D_8 = 5.182$ | | | |
| $r_1 = -210.971$ | | | | |
| | $d_1 = 5.319$ | $n_1 = 1.68893$ | $\nu_1 = 31.1$ | |
| $r_2 = -40.821$ | | | | |
| | $d_2 = 2.952$ | | | |
| $r_3 = -35.784$ | | | | |
| | $d_3 = 2.098$ | $n_2 = 1.77250$ | $\nu_2 = 49.6$ | |
| $r_4 = 90.032$ | | | | |
| | $d_4 = 0.263$ | | | |
| $r_5 = 60.857$ | | | | |
| | $d_5 = 7.215$ | $n_3 = 1.49831$ | $\nu_3 = 65.0$ | |
| $r_6 = -290.297$ | | | | |

| No. | L | T | SA | CM | AS | PT | DS |
|---|---|---|---|---|---|---|---|
| $R_1$ | 0.04836 | −0.00133 | 21.1065 | −0.5812 | 0.0160 | 1.9225 | −0.0534 |
| $R_2$ | 0.01208 | −0.01348 | 1.9567 | −2.1831 | 2.4357 | −0.6065 | <2.0409 |
| $R_3$ | −0.04985 | 0.02772 | −15.8768 | 8.8284 | −4.9091 | −0.4028 | 2.9537 |
| $R_4$ | −0.06287 | −0.00946 | −19.4136 | −2.9206 | −0.4394 | −1.9527 | −0.3599 |
| $R_5$ | 0.01063 | 0.01037 | 0.5639 | 0.5499 | 0.5363 | 0.2157 | 0.7332 |
| $R_6$ | 0.01007 | 0.00136 | 6.0516 | 0.8143 | 0.1096 | 0.3125 | 0.0568 |
| $R_7$ | 0.03350 | −0.01545 | 10.6611 | −4.9152 | 2.2661 | 0.8734 | −1.4474 |
| $R_8$ | | | | | | | |
| $r_1$ | −0.01467 | 0.01290 | −1.5084 | 1.3261 | −1.1658 | 0.0 | 1.0249 |
| $r_2$ | 0.05457 | −0.00823 | 60.7966 | −9.1711 | 1.3835 | 1.5443 | −0.4417 |
| $r_3$ | −0.04079 | 0.00539 | −63.6017 | 8.4056 | −1.1109 | −1.9758 | 0.4079 |
| $r_4$ | −0.00512 | −0.01176 | −0.0308 | −0.0708 | −0.1627 | −0.7034 | −1.9905 |
| $r_4$ | 0.00452 | 0.00699 | 0.1571 | 0.2429 | 0.3754 | 0.7630 | 1.7596 |
| $r_6$ | 0.00406 | −0.00507 | 0.4323 | −0.5394 | 0.6730 | 0.0804 | −0.9400 |
| Total | 0.00451 | −0.00006 | 1.2944 | −0.2141 | 0.0076 | 0.0707 | −0.3376 |

Figure 15:
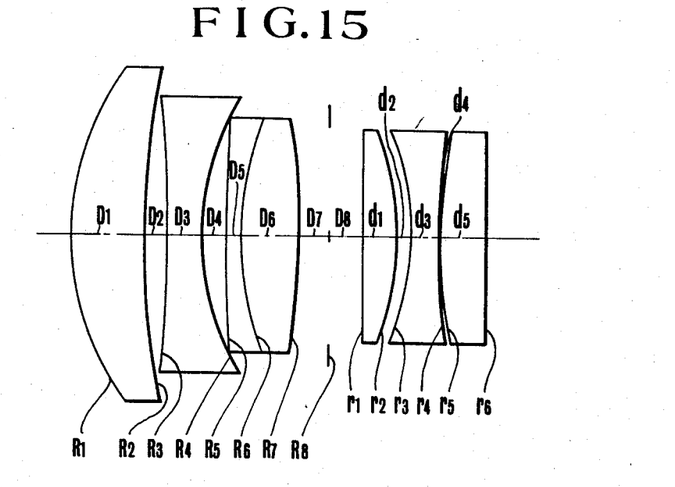
Figure 16A:
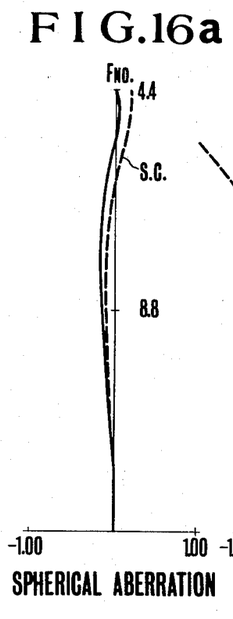
Figure 16B:
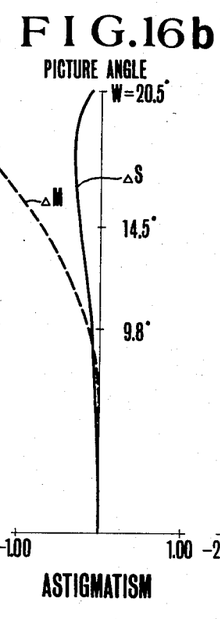
Figure 16C:
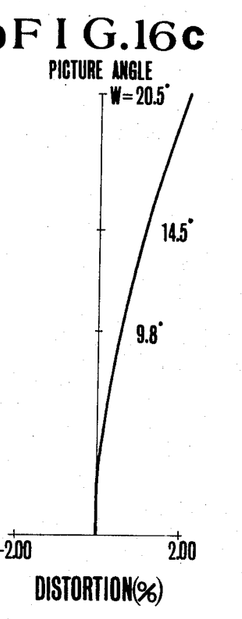

| 7th Embodiment (FIGS. 15 and 16) | | | | |
|---|---|---|---|---|
| f = 152.614 | F-No. 1:4.4 | 2ω = 40.9° | b.f. = 87.646 | |
| $R_8 = 0.$ (Stop) | | | | |
| | $D_8 = 4.831$ | | | |
| $r_1 = 909.937$ | | | | |
| | $d_1 = 4.916$ | $n_1 = 1.58267$ | $\nu_1 = 46.4$ | |
| $r_2 = -35.556$ | | | | |
| | $d_2 = 2.141$ | | | |
| $r_3 = -32.761$ | | | | |
| | $d_3 = 4.206$ | $n_2 = 1.77250$ | $\nu_2 = 49.6$ | |
| $r_4 = 98.906$ | | | | |
| | $d_4 = 0.263$ | | | |
| $r_5 = 71.466$ | | | | |
| | $d_5 = 6.754$ | $n_3 = 1.49831$ | $\nu_3 = 65.0$ | |
| $r_6 = -900.379$ | | | | |

What is claimed is:

1. A lens system having a main photo-taking lens and a fill-in lens lying in between said main photo-taking lens and the image plane and detachable therefrom, and having the following various conditions:

said fill-in lens having, from front to rear, a positive 1st lens, a negative 2nd lens and a positive 3rd lens;

letting $n_1$ and $\nu_1$ denote the refractive index and Abbe number of the glass of said positive 1st lens respectively, $r_5$ the radius of curvature of the front surface of said positive 3rd lens, $d_5$ the axial thickness of said 3rd lens, $n_3$ and $\nu_3$ the refractive index and Abbe number of the glass of said 3rd lens respectively, and f the overall focal length of said main photo-taking lens and said fill-in lens attached thereto, the following relationships are fulfilled:

(1) $0.3 < r_5/f < 0.6$
(2) $0.02 < d_5/f < 0.08$
(3) $1.5 < n_1 < 1.7$
(4) $30.0 < \nu_1 < 50.0$
(5) $1.45 < n_3 < 1.75$
(6) $45.0 < \nu_3 < 85$

* * * * *